(12) United States Patent
Farrow

(10) Patent No.: US 11,005,768 B2
(45) Date of Patent: May 11, 2021

(54) OPTIMISING MULTICAST VIDEO DELIVERY IN A WIRELESS NETWORK

(71) Applicant: BRITISH TELECOMMUNICATIONS PUBLIC LIMITED COMPANY, London (GB)

(72) Inventor: Nicholas Farrow, London (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 0 days.

(21) Appl. No.: 16/641,699

(22) PCT Filed: Aug. 21, 2018

(86) PCT No.: PCT/EP2018/072550
§ 371 (c)(1),
(2) Date: Feb. 25, 2020

(87) PCT Pub. No.: WO2019/038278
PCT Pub. Date: Feb. 28, 2019

(65) Prior Publication Data
US 2020/0358707 A1    Nov. 12, 2020

(30) Foreign Application Priority Data

Aug. 25, 2017   (EP) ..................... 17187983

(51) Int. Cl.
*H04L 12/825* (2013.01)
*H04L 12/26* (2006.01)
(Continued)

(52) U.S. Cl.
CPC ............ *H04L 47/25* (2013.01); *H04L 43/087* (2013.01); *H04L 43/0894* (2013.01);
(Continued)

(58) Field of Classification Search
None
See application file for complete search history.

(56) References Cited

U.S. PATENT DOCUMENTS 9,175,969 B2 * 11/2015 Xie .................... G01C 21/3461
2003/0152032 A1    8/2003 Yanagihara et al.
(Continued)

FOREIGN PATENT DOCUMENTS

EP    2 163 069    11/2010
GB    2481715    1/2014
(Continued)

OTHER PUBLICATIONS

Combined Search and Examination Report for GB Application No. 1713704.3 dated Feb. 23, 2018, 5 pages.
(Continued)

*Primary Examiner* — Otis L Thompson, Jr.
(74) *Attorney, Agent, or Firm* — Nixon & Vanderhye P.C.

(57) ABSTRACT

The invention sets out a method where a critical loading related to jitter associated with a link between the access point and a client device is determined. This critical load is the load beyond which retransmissions are insufficient for the client device to repair the video stream. The critical load is determined by sending data at varying transmission rates during a calibration mode, and measuring the jitter and packet loss rate. A safe load is then set as a fraction of this critical load. The loading associated with a multicast stream is then monitored with reference to this safe load, and if the safe load is met or exceeded, then action is taken to avoid packet loss increasing to a critical level. One action may be to adjust the transmission rate of the multicast stream for example, such that the load is reduced to below the safe load level.

7 Claims, 7 Drawing Sheets

(51) Int. Cl.
*H04L 29/06* (2006.01)
*H04N 21/2662* (2011.01)
*H04W 24/08* (2009.01)
*H04W 28/02* (2009.01)

(52) U.S. Cl.
CPC ..... *H04L 65/4076* (2013.01); *H04N 21/2662* (2013.01); *H04W 24/08* (2013.01); *H04W 28/0252* (2013.01)

(56) References Cited

U.S. PATENT DOCUMENTS

| | | | |
|---|---|---|---|
| 2004/0017822 A1* | 1/2004 | Doan | H04L 25/0262 370/465 |
| 2005/0089043 A1 | 4/2005 | Seckin et al. | |
| 2008/0117930 A1 | 5/2008 | Chakareski et al. | |
| 2012/0224481 A1 | 9/2012 | Babiarz et al. | |
| 2013/0195119 A1 | 8/2013 | Huang et al. | |
| 2017/0244615 A1* | 8/2017 | Takano | H04L 43/04 |
| 2018/0270677 A1* | 9/2018 | Brisebois | H04W 36/0022 |

FOREIGN PATENT DOCUMENTS

| | | |
|---|---|---|
| WO | 02/13468 | 2/2002 |
| WO | 2008/147255 | 12/2008 |

OTHER PUBLICATIONS

Extended European Search Report for EP Application No. 17187983.6 dated Feb. 7, 2018, 8 pages.
International Search Report for PCT/EP2018/072550 dated Oct. 5, 2018, 3 pages.
Written Opinion of the ISA for PCT/EP2018/072550 dated Oct. 5, 2018, 5 pages.

* cited by examiner

OPTIMISING MULTICAST VIDEO DELIVERY IN A WIRELESS NETWORK

This application is the U.S. national phase of International Application No. PCT/EP2018/072550 filed Aug. 21, 2018 which designated the U.S. and claims priority to EP Patent Application No. 17187983.6 filed Aug. 25, 2017, the entire contents of each of which are hereby incorporated by reference.

FIELD OF THE INVENTION

This invention relates to the field of video delivery over a wireless network.

BACKGROUND TO THE INVENTION

Video delivery over IP networks generally use one of two networking streaming technologies: one based on multicast and the other based on unicast (this could be over connection or connectionless oriented networks). With multicast transmission, a single multicast stream carrying the content is pushed from a content server to multiple network nodes simultaneously, with those network nodes duplicating the content and forwarding to any subsequent nodes or client devices as required. With unicast transmission, multiple streams of content are pulled from the server, one stream for each device consuming the content, typically using HTTP over TCP. Multicast delivery makes more efficient use of the network when delivering the same content to many client devices. However, if the number of users is small, then unicast delivery may be more efficient overall.

Delivery using multicast is becoming increasingly popular, particularly so for linear or live television broadcasts. Current multicast video delivery schemes adopt an adaptive bitrate approach, where the same content is encoded at a number of different bit rates, with the playout client using the most appropriate rate, based on network conditions. First generation playout clients would typically use packet loss as a trigger for rate switching (leaving one multicast group and joining another). Current clients monitor playout buffer levels.

Multicast delivery within the home environment typically utilises a wireless access point or router to provide Internet access over a broadband connection. Each of the clients connected to the access point requesting the same content will be part of the same multicast group. When multicasting in this home environment, there is no efficient way of knowing if delivery has been successful to a particular client, due to the one-to-many relationship between the access point and the receiving clients. This can be particularly problematic when the clients in the home network are connecting wirelessly over Wi-Fi, with throughput to each device limited by the network traffic levels and network conditions affecting the maximum network throughput.

Depending on the wireless system's capability, an access point can either degrade the stream to a rate based on the receiving capabilities of the weakest client, or the access point can serialise (unicast) to each client. The first approach results in all clients being down-graded to weakest client quality as all the clients are part of the same multicast group, whilst the second introduces greater bandwidth demands based on the number of clients, negating the advantages of multicast. The weakness of both these approaches are amplified with the advent of ultra high definition (UHD) video streaming requiring much higher bit rates.

SUMMARY OF THE INVENTION

According to one aspect of the present invention, there is provided a method of operating an access point for streaming a media sequence in a wireless network, said method comprising:
   transmitting data packets of a test sequence at a plurality of transmission rates from an access point to a first client device over a wireless network connection;
   determining, for each of the transmission rates, the jitter of the data packets received at the first client device and a packet loss rate at the first client device;
   determining the transmission rate at which the packet loss rate exceeds a threshold, wherein the threshold is a limit for packet loss experienced by the test sequence transmitted from the access point to the first client device, beyond which packet retransmissions are insufficient to repair the test sequence before playout;
   identifying a critical jitter level as the jitter associated with the identified transmission rate;
   setting a safe jitter level as a fraction of the critical jitter level; and transmitting the media sequence from the access point to the first client device, wherein the transmission rate of the media sequence is adjusted such that the associated jitter does not exceed the safe jitter level.

The safe jitter level may be within the repair ability of the system, or put another way, where packet retransmissions are sufficient to repair the media sequence before playout.

The method may further comprise transmitting data packets from the access point to a second client device, and adjusting the transmission rate of the data packets from the access point to the second client device if the jitter associated with the first client device exceeds the safe jitter level.

Alternatively, the method may further comprise transmitting data packets from the access point to a second client device, and adjusting the transmission rate of the media sequence from the access point to the first client device if the jitter associated with the first client device exceeds the safe jitter level.

The second client may have an associated safe jitter level. The jitter described may be an average jitter taken over a period of time.

The media sequence may be a multicast media stream.

According to a further aspect of the present invention, there is provided an access point configured to:
   transmit data packets of a test sequence at a plurality of transmission rates to a first client device over a wireless network connection, and to:
   determine, for each of the transmission rates, the jitter of the data packets received at the first client device and a packet loss rate at the first client device;
   determine the transmission rate at which the packet loss rate exceeds a threshold, wherein the threshold is a limit for packet loss experienced by the test sequence transmitted from the access point to the first client device, beyond which packet retransmissions are insufficient to repair the test sequence before playout;
   identify a critical jitter level as the jitter associated with the identified transmission rate;
   set a safe jitter level as a fraction of the critical jitter level; and
   transmit the media sequence from the access point to the first client device, wherein the transmission rate of the media sequence is adjusted such that the associated jitter does not exceed the safe jitter level.

Embodiments of the invention allow an access point to implement an efficient delivery scheme within the capability of all client devices based on radio reception characteristics as well as traffic levels.

For Wi-Fi, there are a large number of client device radios, ranging from cheap dongles to top end video bridges. When considering the available range of commercial access points, there are almost an infinite number of access point—client combinations, each having unique performance characteristics. In addition, performance is also highly affected by the client's range or location in the home, with respect to the access point. This invention assesses the unique nature of each access point—client link as a network 'loading' characterisation.

Other non-video traffic flows over the Wi-Fi network may impact multicast video streams and end clients. Low level browsing will have no effect where as a torrent download or other high bit rate data traffic will show an increase in loading. A high bit rate data client in a good location will scale to what it deems to be a practical bandwidth (i.e. using TCP). However, this may cause a multicast video stream to break up for a remote client. Using this invention, the access point will 'see' the effect of the high data on the remote client using loading measurements, and be in a position to apply some back-off (or other policy decision) to the clients.

BRIEF DESCRIPTION OF THE DRAWINGS

For a better understanding of the present invention reference will now be made by way of example only to the accompanying drawings, in which.

DESCRIPTION OF PREFERRED EMBODIMENTS

The present invention is described herein with reference to particular examples. The invention is not, however, limited to such examples.

Examples of the present invention present a method of multicast video (or other media) delivery from an access point to a client device over a wireless link. Streaming of video to a client device over multicast can experience lost packets when the wireless link experiences random interference or is under stress, for example as a result of interference, other traffic sharing the wireless link or if the signal strength at the client is weak. This can be partly mitigated by retransmitting lost packets to the client device over unicast. However, packet loss can reach a limit beyond which retransmissions are insufficient to repair the video stream for playback at the client.

Examples of the invention set out a method to mitigate this, whereby a critical loading related to jitter associated with a link between the access point and a client device is determined. This critical load is the load beyond which retransmissions are insufficient for the client device to repair the video stream. The critical load is determined by sending data at varying transmission rates during a calibration mode, and measuring the jitter and packet loss rate. A safe load is then set as a fraction of this critical load. The loading associated with a multicast stream is then monitored (referred to as the sustain mode) with reference to this safe load, and if the safe load is met or exceeded, then action is taken to avoid packet loss increasing to a critical level. One action may be to adjust the transmission rate of the multicast stream for example, such that the load is reduced to below the safe load level.

Examples of the invention also cover multi-client scenarios, where links and associated loadings of existing clients are also taken into account.

Figure 1:
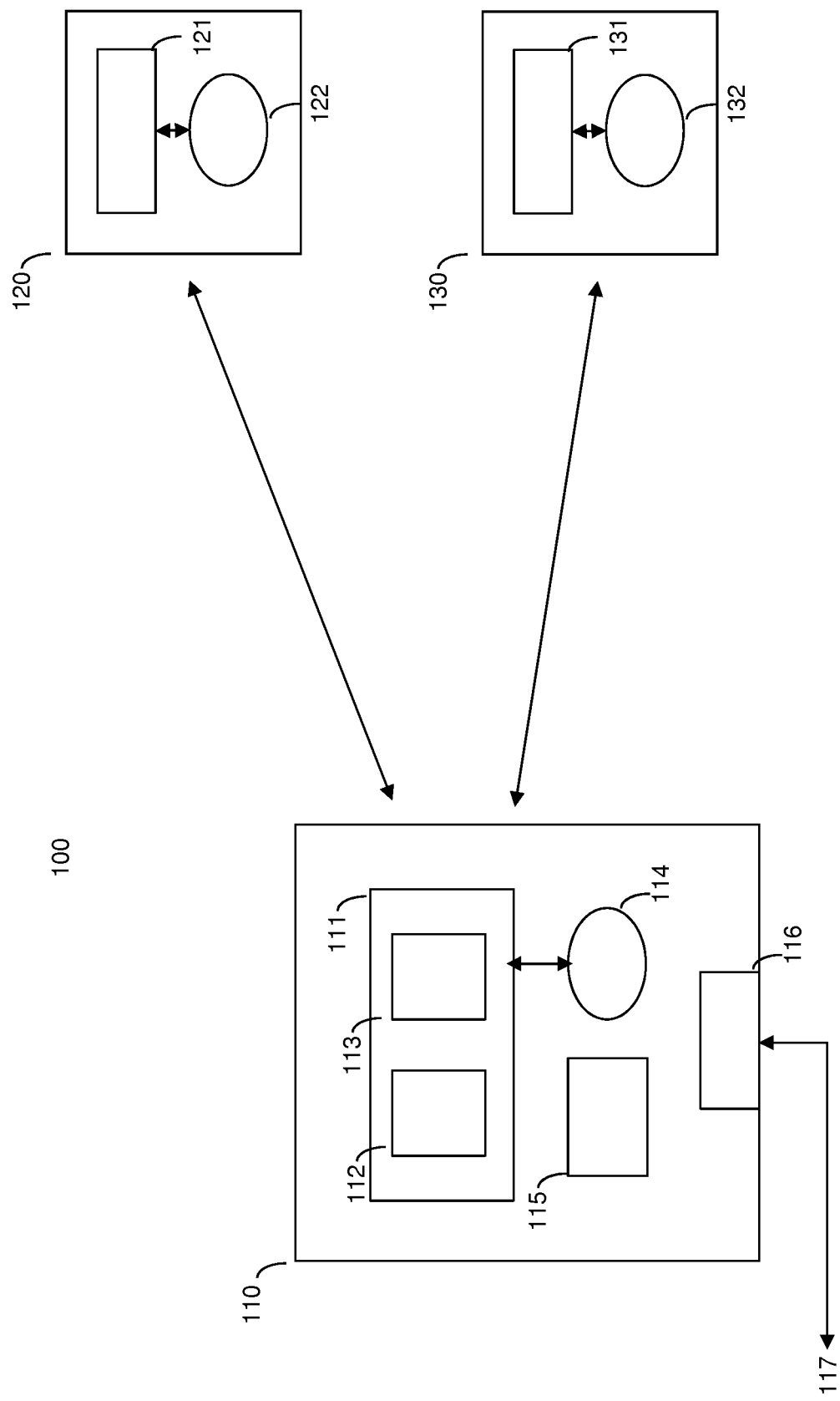
FIG. 1 is a system diagram of a home network in an example of the present invention.

FIG. 1 shows a home network 100, comprising an access point 110 and client devices 120 and 130. The access point 110 comprises a DSL interface 116 providing access to a wide area network 117 such as the Internet, as well as a Wi-Fi interface 111 providing wireless connectivity to local Wi-Fi compliant devices in accordance with the IEEE 802.11 standard. An example of an access point is a home router, which can connect devices within the home to each other as well as the Internet. Client device 120 comprises a Wi-Fi interface 121 providing Wi-Fi connectivity, for example to the access point 111. Similarly, client device 130 also comprises a Wi-Fi interface 131, providing Wi-Fi connectivity. Examples of client devices include laptops, tablets and set-top boxes.

The access point 110 can communicate wirelessly with the client devices 120 and 130 via their respective Wi-Fi interfaces, and provide both with access to the Internet. Thus, client device 120 and 130 can browse the Internet, stream video, and such like, with the access point 110 acting as a gateway, transmitting data to and from the client devices.

The client devices 120 and 130 each further comprise a load assessor module 122 and 132 respectively. The access point 110 further comprises a flow monitor module 112 and a flow degrader module 113 within the Wi-Fi interface 111. The access point also has a load predictor module 114 and a policy module 115. A skilled person will appreciate that the various modules can be implemented as software modules operating in conjunction with a processor in the respective access point or client device, or alternatively as hardware modules.

Examples of the present invention are directed to the management of multicast video delivery to client devices. Multicast video can be streamed to the client devices from a media server (not shown) over the Internet to the access point 110, and then wirelessly from the access point 110 to the client devices.

The load assessor module 122 works in conjunction with the load predictor module 114 in two modes of operation: calibration mode and sustain mode. In the calibration mode, the load predictor module 114 sends a data stream at a range of transmission rates from the access point 110 to the client device 120 over a wireless link. The load assessor module 122 measures the loading of the wireless link, in the form of jitter, at each of the transmission rates, and reports the results back to the load predictor module 114. The load assessor module also reports if any of the streams have experienced packet loss that is beyond the capabilities of the system to repair, based on retransmitting lost packets over unicast from a retransmission server. The load predictor module 114 can use these reports to determine a "critical load" value for the wireless link, which occurs when the packet loss rate is equal to or worse than the maximum repair rate, beyond which packet loss becomes unrepairable (this might be for example 10% packets lost).

The load predictor module 114 also sets a "safe load" value, which is a load that represents a point where the client device can expect to receive a multicast stream with a high degree of reliability and well within the critical packet loss rate. This safe load value is typically set as a fraction of the critical load value. The safe load value also ensures that sufficient Wi-Fi channel utilisation is available for non-multicast traffic.

During the calibration of a client device, the load predictor 114 may also halt the traffic rate progression if it finds the loading of another client device is approaching its critical load value. In this way, no existing streams are broken.

When client calibration is complete, the access point 110 can start delivery of a multicast stream (video or audio) to the client device in sustain mode, with the transmission rate chosen such that the safe load value is not exceeded over the wireless link. Furthermore, the load predictor module 114 can monitor the loading on the wireless link during multicast delivery to ensure that the loading is within safe levels and request or initiate action if not.

The access point 110 also has a flow monitor module 112 and a flow degrader module 113. The flow monitor module 112 reports the bitrate of existing streams over the Wi-Fi interface 111. The flow degrader module 113 is an active component that degrades an active stream to a given bitrate. The policy unit 115 holds policy information about client devices and multicast media streams, such that it can give a priority judgement indication over which client devices or streams to prioritise/protect. The policy information is thus used to resolve situations arising from the sustain mode.

Figure 2:
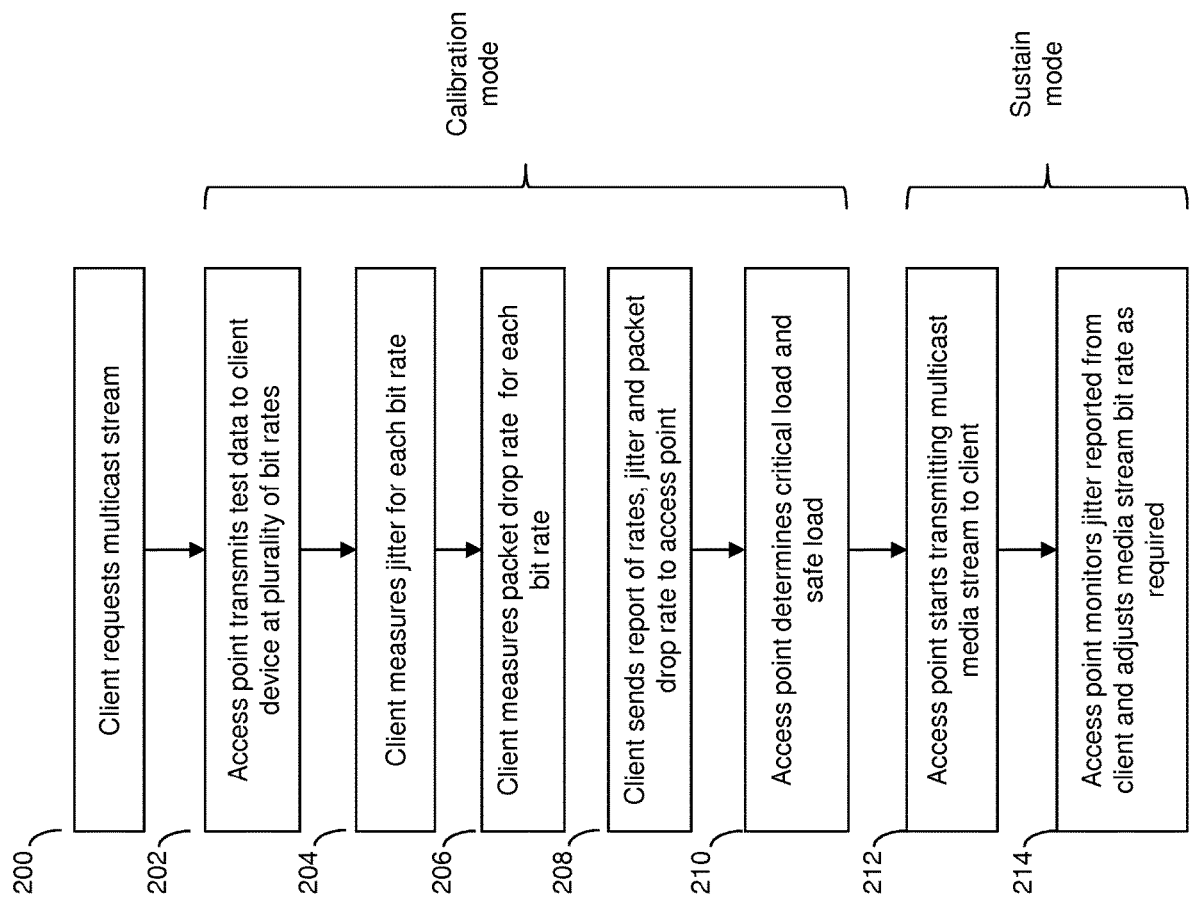
FIG. 2 is a flow chart summarising the steps of an example of the present invention.

A more detailed description of examples of the invention will now be described with reference to the flow chart of FIG. 2.

Processing starts at step 200. In this example, the client device 120 makes a request to join a multicast video stream or group by sending a multicast join request, which is processed by the access point 110. For example, a user may click on a link to a video stream on a tablet, or select a channel to watch on a set-top box.

The access point 110, detects the multicast join request, and the load predictor module 114 initiates calibration. The multicast join request for the media stream is effectively held by the load predictor module 114 until calibration is complete, after which the multicast routing is processed by the network. Alternatively, the join request is processed by the network as calibration is initiated, but the incoming multicast stream packets are not forwarded onto the client device 120 until the calibration is complete.

In step 202, the load predictor module 114 initiates the transmission, from the access point 110 to the client device 120, of a test sequence of data packets starting at a low transmission or bit rate, and then increasing the bit rate for further test sequences. In other words, the sequence is transmitted a number of times, each at a different bit rate. The aim is to perform the measurements set out in steps 204 and 206 at each bit rate used.

In alternative arrangements, the load predictor module 114 could use knowledge of previous streams to the client device 120 to select the starting bit rate. For example, if the client device had recently successfully streamed some media at 4 Mbps, then the load predictor module 114 could start calibration at or just under 4 Mbps.

Figure 3:
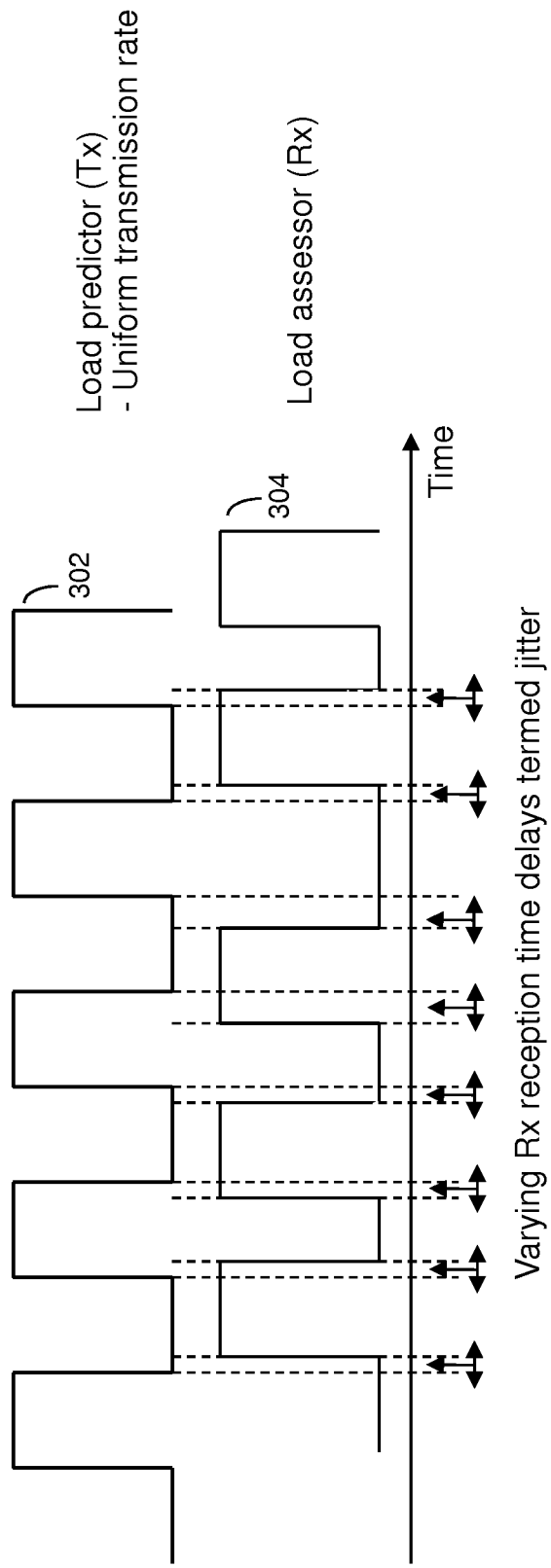
FIG. 3 is a diagram illustrating a transmitted test sequence, the received test sequence, and the associated jitter.

The test sequence is received by the client device 120. The load assessor module 122 measures the jitter associated with the received test sequence at each bit rate used (step 204). FIG. 3 illustrates the test sequence 302 sent by the access point and test sequence 304 received by the client device 120 as a function of time. The form of the test sequence (in particular the interval between the test data packets) and bit rate of each transmission is known to the load assessor module 122 (this can be sent in advance by the load predictor 114 to the load assessor module 122). The load assessor module 122 is thus able to measure the jitter of the received data packets, where jitter is the variation in the time delay in receiving the data packets. In one example, the average jitter across the whole or portion of the test sequence is used.

The load assessor module 122 also measures the packet loss rate (PLR) for the sequence at each bit rate. PLR is defined as the rate of packet loss between the access point and the client device 120.

In step 208, the load assessor module 122 sends a load report to the load predictor module 114. The load report consists of the following: jitter value, packet loss rate, the bit rate calibration test sequence, and the total bit rate as seen through the Wi-Fi interface 121.

The bit rate of calibration test data is the bit rate of the test sequence. However, there may be other data being transmitted to the client during calibration. As an example, a client device, such as a STB, where a user is viewing a (unicast) 6 Mbps film whilst wanting to record a live multicast sports feed. In this case, the calibration bit rate will be applied in addition to the bit rate of the existing unicast stream. Thus, the total bit rate is that of the calibration test data plus any other data that is also being transmitted to the client device 120. In this example, if the test sequence bit rate is 16 Mbps, and the bit rate of the unicast traffic is 6 Mbps, then the total bit rate is 22 Mbps. In many cases, there may not be any other traffic other than the test sequence.

This report is sent for each test sequence at each of the bit rates. When the load predictor module 114 receives the report, it uses it to determine if the wireless link to the client 120 has reached critical load.

Figure 4:
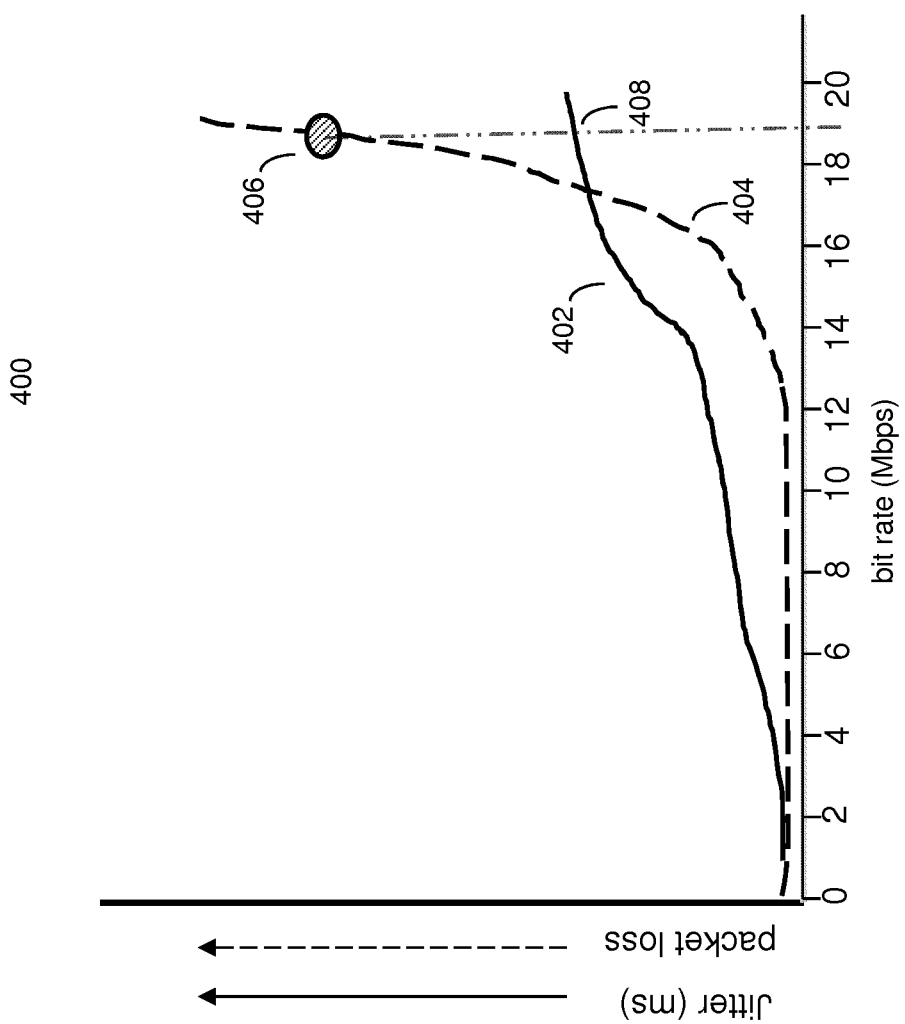
FIG. 4 is a graph illustrating how jitter and packet loss rate both increases with increasing total bit rate.

Reference is made to the chart in FIG. 4, which shows how the jitter 402 and packet loss rate 404 increases with increasing total bit rate (shown on the x-axis). As described above, based on the sequence being part of a multicast stream with retransmission capabilities, when packet loss rate is low, lost packets can be replaced based on retransmitting the lost packets over unicast to the client device 120 from a retransmission server. However, the packet loss rate can increase to a critical point 406, beyond which the retransmission server is unable to retransmit at a rate high enough to replace lost packets, and thus insufficient to repair the sequence before playout. The critical point is marked as 406 in FIG. 4.

The load assessor module 114 continues to send test sequences at increasing bit rates, and receives the resulting reports from the load assessor 122, until the critical point is reached, and thus steps 202 to 208 are repeated at different bit rates. Once the critical point has been reached, a critical load and safe load are determined in step 210.

The critical load is the jitter associated with the test sequence of packets when the critical point is reached. Or put another way, the critical load is the jitter associated with the total bit rate at which the critical point is reached. The critical load is marked as 408 in FIG. 4. The jitter may be the average jitter as described earlier.

Figure 5:
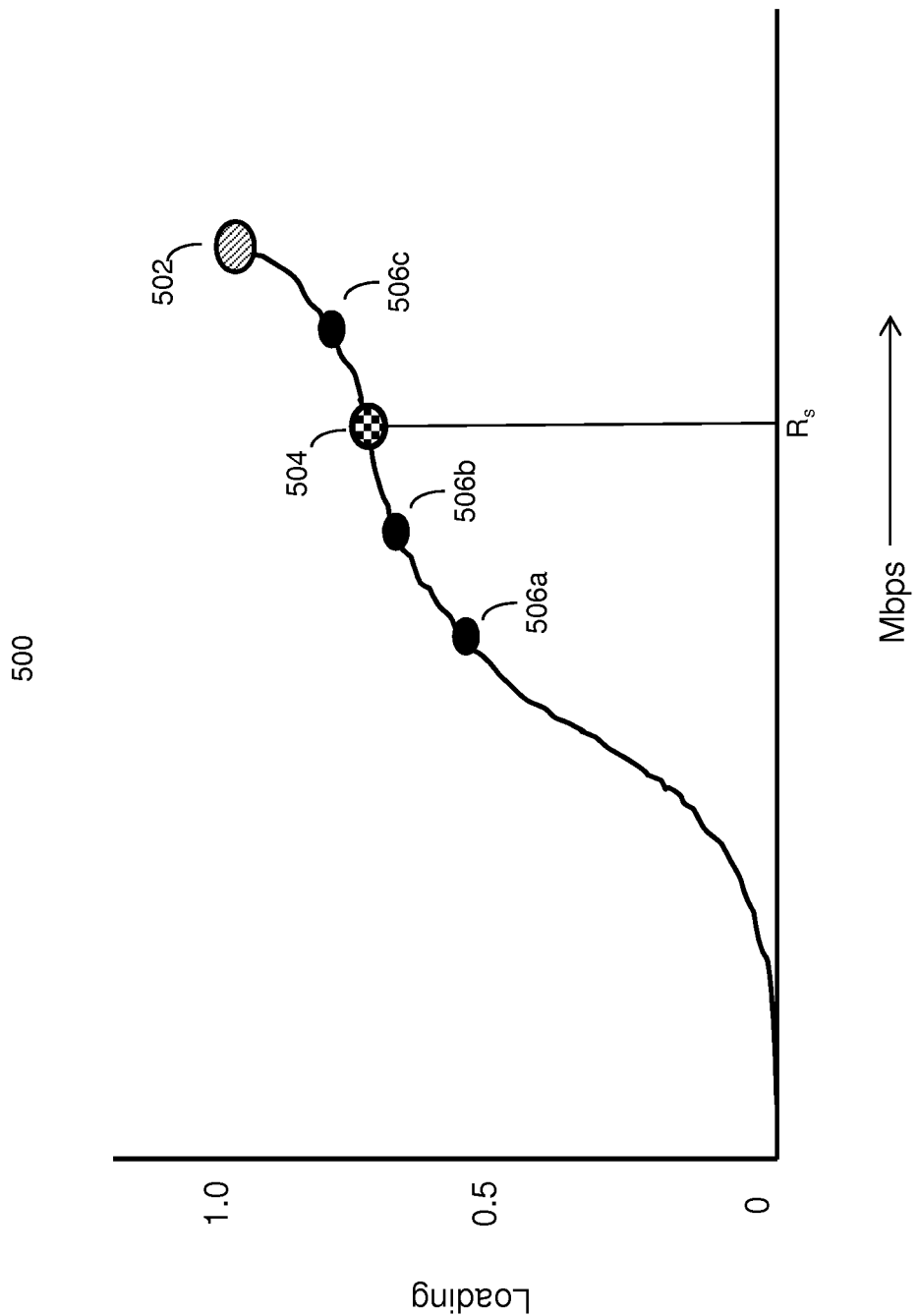
FIG. 5 is a graph showing normalised jitter values, or loading.

The load predictor module 114 can also normalise the jitter values to a probability of unrecoverable packet loss. A probability of 1 being the critical load point, where unrecoverable packet loss is expected. This then gives a measure that can be compared across client devices that might otherwise have very different jitter characteristics. FIG. 5 shows a graph 500 of the normalised jitter values, or loading. Point 502 is the critical load with a probability of 1, and 504 is a safe load. Points 506a, 506b and 506c are intermediate loads.

The safe load is determined by the load predictor module 114. The purpose of the safe load value is to provide a reference point or margin where the existing video system recovery capabilities can deal with expected Wi-Fi packet losses and fluctuations as will be discussed later.

Figure 6:
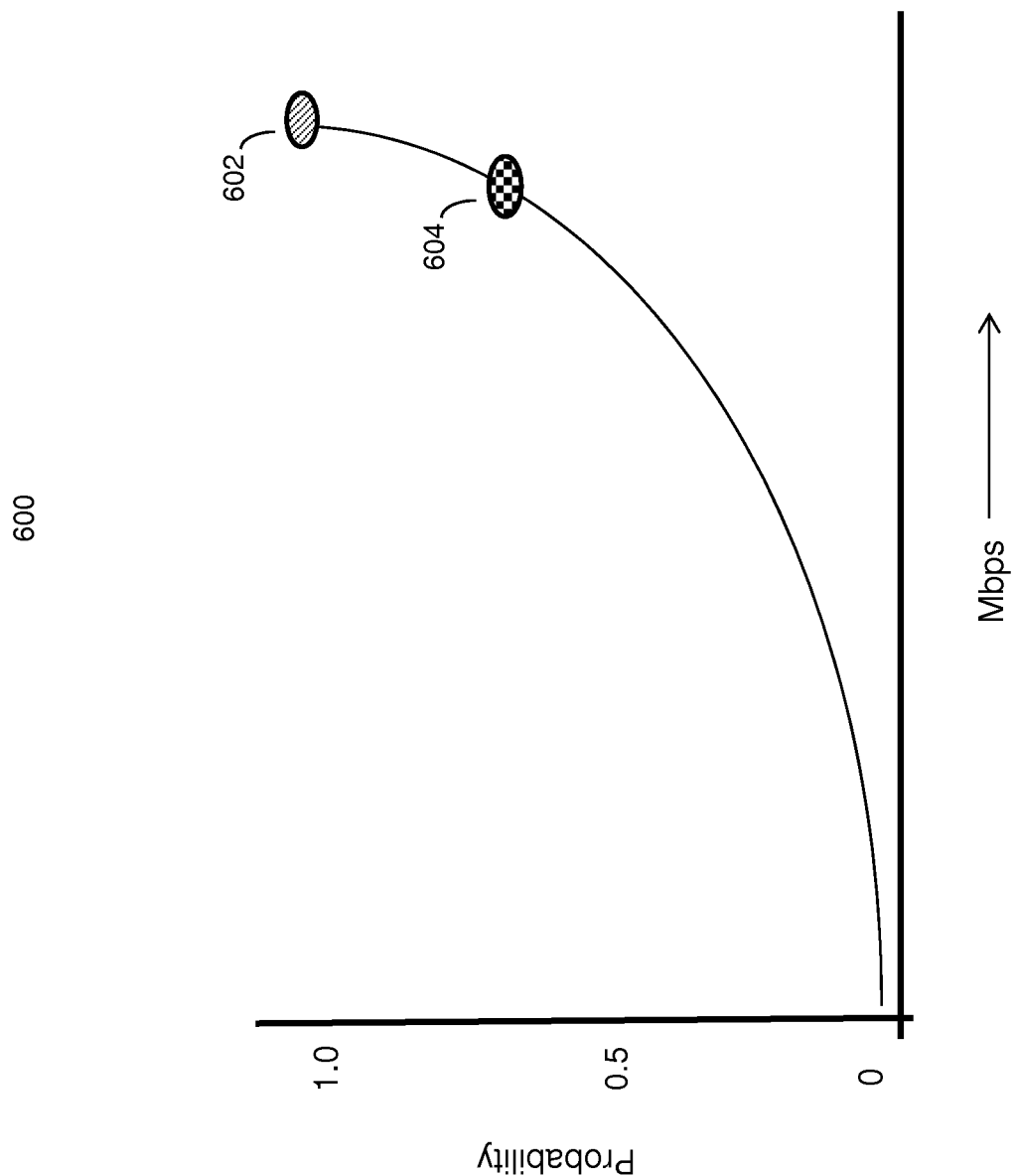
FIG. 6 is a graph showing an example of a non-linear load curve.

Typically, safe load values might be set as a fraction of the critical load value, for example between 0.5 and 0.8 of the critical load. However, the actual safe load value will take into account a number of factors:
 a) The content being requested. If the multicast stream is a high bit rate or premium content, then a more conservative/lower safe load value may be used.
 b) The playout device. If the playout device is deemed by the customer to represent a primary viewing device, then again a conservative safe load value can be used.
 c) The journey to the critical load. If the jitter reports from the calibration sequences indicate a linear progression, then the safe load value can be chosen with a higher level of confidence. FIG. 5 has a relatively linear progression and a safe load value can be set with confidence, and thus a safe load can be set as a high fraction of the critical load value (e.g. 0.8 of critical load). However, FIG. 6 shows an example of a non-linear load curve 600. This curve has a high degree of non-linearity towards the critical load point 602 requiring a higher margin of error, and thus a safe load value 604 can be set as a lower fraction of the critical load value (e.g. 0.5 of critical load).

Once the critical load and safe loads have been determined, calibration mode finishes and sustain mode starts, with the access point 110 starting transmission in step 212 of the requested multicast media stream to the client device 120. The multicast streaming rate selected is that of the total bit rate of the stream when the safe load was reached i.e. the combined rate of the test sequence and any other traffic being streamed at the time. Reference is made to FIG. 5, where this rate is marked up on the rate axis as $R_s$. Whilst the requested multicast media is being streamed to the client device 120, the load assessor module 122 measures the jitter associated with the received multicast media stream, and reports back the jitter to the load predictor module 114. This can be done at intervals or when the loading changes by a certain amount, for example by 0.1.

In step 214, the load predictor module 114 monitors the jitter reported back from the load assessor module 122, and adjusts the media stream bit rate as required. In particular, if the jitter exceeds the safe load value, then a request can be made to join a lower bit rate media stream so that the jitter on the wireless link between the access point and the client device 120 is not at risk of reaching the critical load, and thus unrepairable packet loss.

In practice, the bit rate of the media stream selected at the start and during sustain mode would be a rate below the rate associated with the safe load, so that the safe load is not exceeded as a result of minor load fluctuations. This can be done by instructing the client directly to join a different multicast stream. Alternatively, or if there is no mechanism to directly instruct the client device, then the access point (specifically the flow degrader) can start dropping packets from the higher rate stream to trigger the client device to switch to a stream that is within the safe loading.

Examples of the above invention can be extended to multiple clients, with the load predictor module 114 able to determine a safe load value for each client device, and adjust media delivery with reference to each safe load value. Some specific techniques for managing a system that includes more than one client will now be described below.

For the purposes of this example, we consider adaptive video clients as in the single client scenario but for multi-client calibration. We assume no other traffic is present on the network in this example (although calibration with other traffic is discussed above). Furthermore, for simplicity, reference is made directly to safe and critical bit rates, which are the bit rates of the streams associated with the safe and critical loads respectively determined during calibration using the test sequence bit rates.

Figure 7:
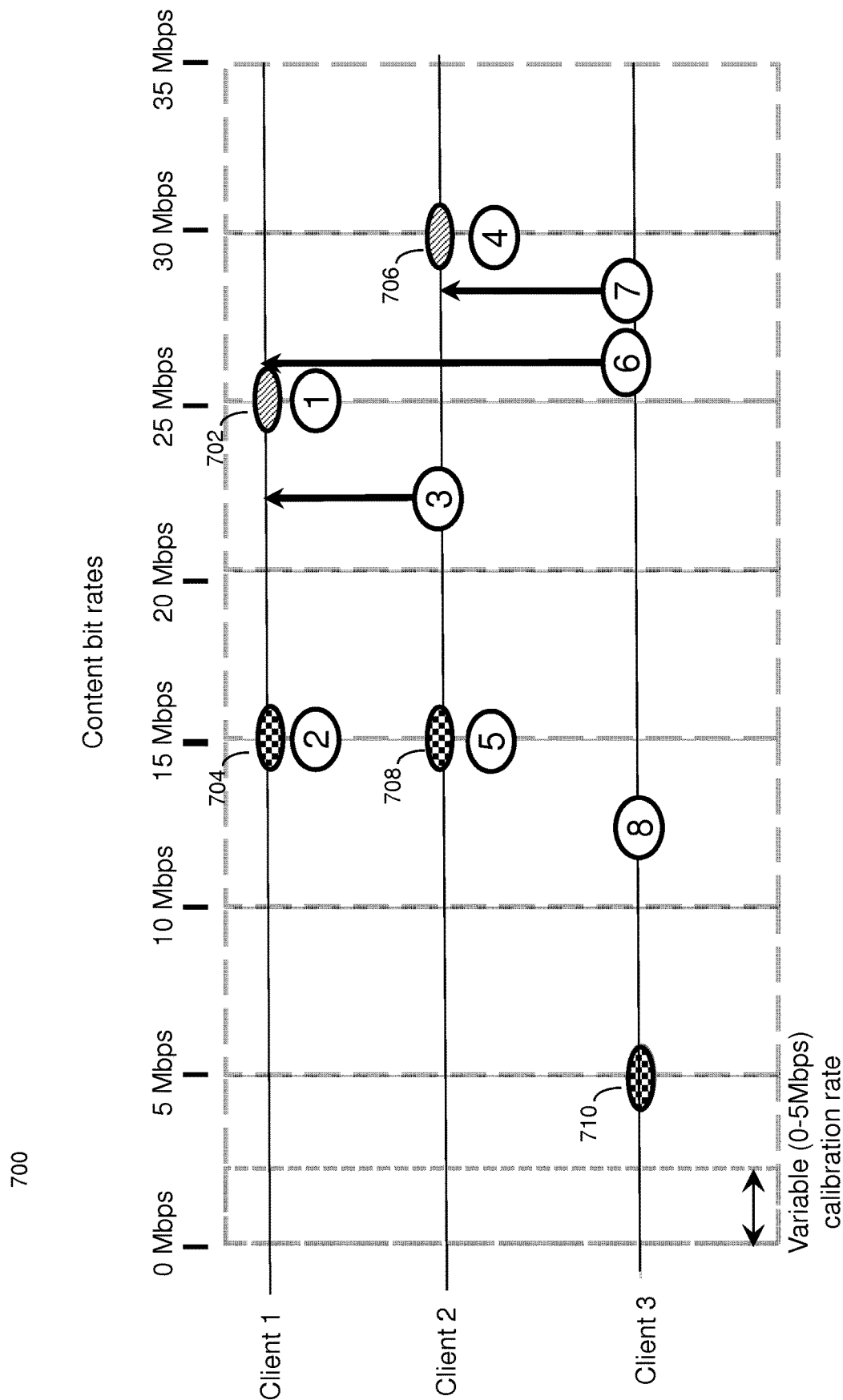
FIG. 7 is a diagram showing the calibration of multiple clients.

Reference is made to the chart 700 in FIG. 7, which shows how multiple clients are calibrated. The specific methods for calibration, including determining of critical and safe loads, is the same as for the single client example described earlier.

In this example, client 1 is the first to request to join a multicast group. Via iterations of the calibration test sequence as for the single client example, various bit rates of the test sequence are stepped through, resulting in the determination of a critical bitrate at step 1, 702, which represents the streaming rate deemed as critical (i.e. the last streaming rate encountered before the critical load was reached. Thus, step 2 is the streaming bit rate that is deemed safe i.e. associated with the safe load, and here is 15 Mbps. Client 1 can thus start streaming multicast media at 15 Mbps (or marginally lower as described earlier). Client 2 wishes to join the same multicast group. It repeats the same calibration process, during which client 1 reaches the bit rate shown in step 3. The higher critical rate, step 4, for client 2 is due to more favourable device characteristics/location etc. The full client 2 calibration is completed without the critical load of client 1 being reached. The access point instructs client 2 to use the same 15 Mbps rate multicast stream as client 1 (step 5). Taking this approach the access point is now serving 2 clients with the same 15 Mbps multicast stream. Alternatively, the access point could have decided to give client 2 the higher rate of 20 Mbps resulting in 35 Mbps total traffic, but sharing the same multicast stream results in the greatest network efficiency. These are decisions that can be managed by a suitable policy.

Client 3 wishes to receive a different stream and starts the calibration process. However, due to the device capabilities and or location more air time is taken and it impacts the Wi-Fi channel. The calibration process is halted as client 1 breaches its critical load (step 6) during calibration, though client 2 is within its limits (step 7). Step 8 indicates that the actual critical level for client 3 has not been reached. At this point the safe level is calculated as before from the level achieved in step 8. The total multicast traffic is now 20 Mbps.

There are a number of possible algorithms the access point could run, largely based on the usage of the multicast channels. However, the above example illustrates multiple channels being activated whilst keeping the network within safe operating limits for all clients.

The operation of the sustain mode after calibration will now be described, with a discussion of a number of situations that can arise where intervention is required to maintain a stable network for video multicasting. Again, this is illustrative showing how the methods can be used to adapt to a range of situations, which may require a policy to determine the stabilising actions.

If all clients show a significant load increase, such that one or more clients are critical, then action should be taken. If new high rate traffic flows occurred, a policy decision needs to be made to either downgrade one or more multicast content groups to a lower bitrate, or the new traffic flow.

If all clients show a significant load increase and there is no significant traffic/throughput increase, the load increase is likely to be due to noise on the Wi-Fi channel or one or more clients moving. If such a client can be readily identified (e.g. by a large change in its loading relative to the other loadings), that client can be instructed to drop to a lower rate stream. If a client cannot be identified, all the clients can be instructed to drop to a lower rate stream.

If all clients show a significant decrease in loading from the safe load (for example by 10%), the safe and critical load values are too conservative and recalibration can be repeated. In this way, higher rate content streams can be introduced to the clients when the network can support higher rate streaming.

If the weakest client no longer requires a multicast stream (IGMP leave detected), removal of the weakest client re-calibration is performed. After re-calibration, if appropriate, an upgrade to the higher bit rate streams for the remaining clients may occur.

As described above, any client joining will trigger re-calibration. The safest approach is also to re-calibrate upon a client leaving. However, there may be optimisations where this need not occur e.g. it was not the weakest client, it was on the same multicast group as another client, etc. Handling these distinctions is not key to the invention, therefore for simplicity we assume re-calibration for both a client joining and leaving.

In general, it is noted herein that while the above describes examples of the invention, there are several variations and modifications which may be made to the described examples without departing from the scope of the present invention as defined in the appended claims. One skilled in the art will recognise modifications to the described examples.

The invention claimed is:

1. A method of operating an access point for streaming a media sequence in a wireless network, said method comprising:
    transmitting data packets of a test sequence at a plurality of transmission rates from an access point to a first client device over a wireless network connection;
    determining, for each of the transmission rates, the jitter of the data packets received at the first client device and a packet loss rate at the first client device;
    determining the transmission rate at which the packet loss rate exceeds a threshold, wherein the threshold is a limit for packet loss experienced by the test sequence transmitted from the access point to the first client device, beyond which packet retransmissions are insufficient to repair the test sequence before playout;
    identifying a critical jitter level as the jitter associated with the identified transmission rate;
    setting a safe jitter level as a fraction of the critical jitter level; and
    transmitting the media sequence from the access point to the first client device, wherein the transmission rate of the media sequence is adjusted such that the associated jitter does not exceed the safe jitter level.

2. A method as claimed in claim 1, further comprising:
    transmitting data packets from the access point to a second client device, and adjusting the transmission rate of the data packets from the access point to the second client device if the jitter associated with the first client device exceeds the safe jitter level.

3. A method as claimed in claim 1, further comprising:
    transmitting data packets from the access point to a second client device, and adjusting the transmission rate of the media sequence from the access point to the first client device if the jitter associated with the first client device exceeds the safe jitter level.

4. A method as claimed in claim 1, wherein the second client has an associated safe jitter level.

5. A method as claimed in claim 1, wherein the jitter is an average jitter over a period of time.

6. A method as claimed in claim 1, wherein the media sequence is a multicast media stream.

7. An access point configured to:
    transmit data packets of a test sequence at a plurality of transmission rates to a first client device over a wireless network connection, and to:
    determine, for each of the transmission rates, the jitter of the data packets received at the first client device and a packet loss rate at the first client device;
    determine the transmission rate at which the packet loss rate exceeds a threshold, wherein the threshold is a limit for packet loss experienced by the test sequence transmitted from the access point to the first client device, beyond which packet retransmissions are insufficient to repair the test sequence before playout;
    identify a critical jitter level as the jitter associated with the identified transmission rate;
    set a safe jitter level as a fraction of the critical jitter level; and
    transmit the media sequence from the access point to the first client device, wherein the transmission rate of the media sequence is adjusted such that the associated jitter does not exceed the safe jitter level.

* * * * *